US008763321B1

(12) United States Patent
Clemens

(10) Patent No.: US 8,763,321 B1
(45) Date of Patent: Jul. 1, 2014

(54) UNIVERSAL NON-PENETRATING ROOF SOLAR PANEL MOUNTING SYSTEM

(71) Applicant: Jonathan A. Clemens, Port Townsend, WA (US)

(72) Inventor: Jonathan A. Clemens, Port Townsend, WA (US)

(73) Assignee: Olympic Energy Systems, Inc., Centralla, WA (US)

( * ) Notice: Subject to any disclaimer, the term of this patent is extended or adjusted under 35 U.S.C. 154(b) by 0 days.

(21) Appl. No.: 13/743,704

(22) Filed: Jan. 17, 2013

Related U.S. Application Data

(63) Continuation-in-part of application No. 12/723,871, filed on Mar. 15, 2010, now abandoned.

(51) Int. Cl.
*E04D 13/18* (2014.01)

(52) U.S. Cl.
USPC .............. 52/173.3; 52/23; 52/223.6; 248/237

(58) Field of Classification Search
CPC . F24J 2/5241; F24J 2002/5286; F24J 2/5427; E04B 9/18
USPC ................ 52/22, 23, 83, 173.1, 173.3, 223.6, 52/223.14
See application file for complete search history.

(56) References Cited

U.S. PATENT DOCUMENTS

| | | | |
|---|---|---|---|
| 2,999,340 A | 9/1961 | Maculan | |
| 3,035,591 A | 5/1962 | Patten | |
| 3,411,050 A | 11/1968 | Middleton et al. | |
| 3,777,425 A | 12/1973 | Le Bourgeois | |
| 4,055,161 A | 10/1977 | Jones | |
| 4,184,482 A | 1/1980 | Cohen | |
| 4,202,319 A | 5/1980 | Vinz | |
| 4,233,961 A | 11/1980 | Kelly | |
| 4,308,858 A | 1/1982 | Skillman | |
| 4,418,685 A | 12/1983 | Frazier | |
| 4,552,438 A | 11/1985 | Murphy | |
| 4,832,001 A * | 5/1989 | Baer | 126/579 |
| 5,582,197 A | 12/1996 | Dobberstein | |
| 5,623,788 A * | 4/1997 | Bimberg et al. | 52/23 |
| 5,746,839 A | 5/1998 | Dinwoodie | |
| 5,819,477 A * | 10/1998 | Gaffney | 52/23 |
| 6,233,881 B1 | 5/2001 | Rainbolt | |
| 6,237,241 B1 | 5/2001 | Aaron | |

(Continued)

OTHER PUBLICATIONS

U.S. Appl. No. 11/731,363, filed Mar. 30, 2007, Brazier.

(Continued)

*Primary Examiner* — Basil Katcheves
*Assistant Examiner* — Joshua Ihezie
(74) *Attorney, Agent, or Firm* — Virginia P. Shogren

(57) ABSTRACT

A roof-based system for suspending photovoltaic modules, such as solar panels, relative to a roof surface without penetration of the roof surface. Cables under tension span the roof surface, with opposed ends of the cables securely mounted to generally C-shaped cable arm assemblies that wrap around the roof edge for connection via pivot joint assemblies to the underside of an overhanging eave, the immediate side wall of the structure below the roof, or directly to roof edge fascia. The system is completely contained to the roof area with no penetration of any parts through the roof surface. Vertical and horizontal rails set upon the roof surface, but not attached to the roof surface, support the weight of the photovoltaic modules attached thereto, while the cables, under tension, hold down the rails in position relative to the roof surface.

12 Claims, 17 Drawing Sheets

(56) References Cited

U.S. PATENT DOCUMENTS

| | | | |
|---|---|---|---|
| 6,360,491 B1 | 3/2002 | Ullman | |
| 6,584,737 B1 | 7/2003 | Bradley, Jr. | |
| 6,634,615 B1 * | 10/2003 | Bick et al. | 248/499 |
| 6,968,654 B2 | 11/2005 | Moulder | |
| 6,970,143 B2 | 11/2005 | Allen et al. | |
| 7,102,074 B2 * | 9/2006 | Yen et al. | 136/244 |
| 7,285,719 B2 | 10/2007 | Conger | |
| 7,406,802 B2 | 8/2008 | Stackenwalt et al. | |
| 7,913,466 B2 * | 3/2011 | Stackenwalt et al. | 52/222 |
| 7,963,074 B2 * | 6/2011 | Schwarze et al. | 52/173.3 |
| 8,015,765 B2 * | 9/2011 | Stackenwalt et al. | 52/222 |
| 2003/0177705 A1 * | 9/2003 | Forbis et al. | 52/3 |
| 2007/0246039 A1 | 10/2007 | Brazier et al. | |
| 2008/0168981 A1 | 7/2008 | Cummings et al. | |
| 2010/0294265 A1 | 11/2010 | Baer et al. | |
| 2011/0197418 A1 * | 8/2011 | Overturf et al. | 29/428 |
| 2012/0118355 A1 * | 5/2012 | Rudolfs | 136/251 |
| 2012/0124922 A1 * | 5/2012 | Cusson et al. | 52/173.3 |

OTHER PUBLICATIONS

U.S. Appl. No. 10/506,145, filed Sep. 12, 2002, Russell.
U.S. Appl. No. 11/644,643, filed Dec. 22, 2006, Allen.
U.S. Appl. No. 11/328,062, filed Jan. 10, 2006, Genschorek.

* cited by examiner

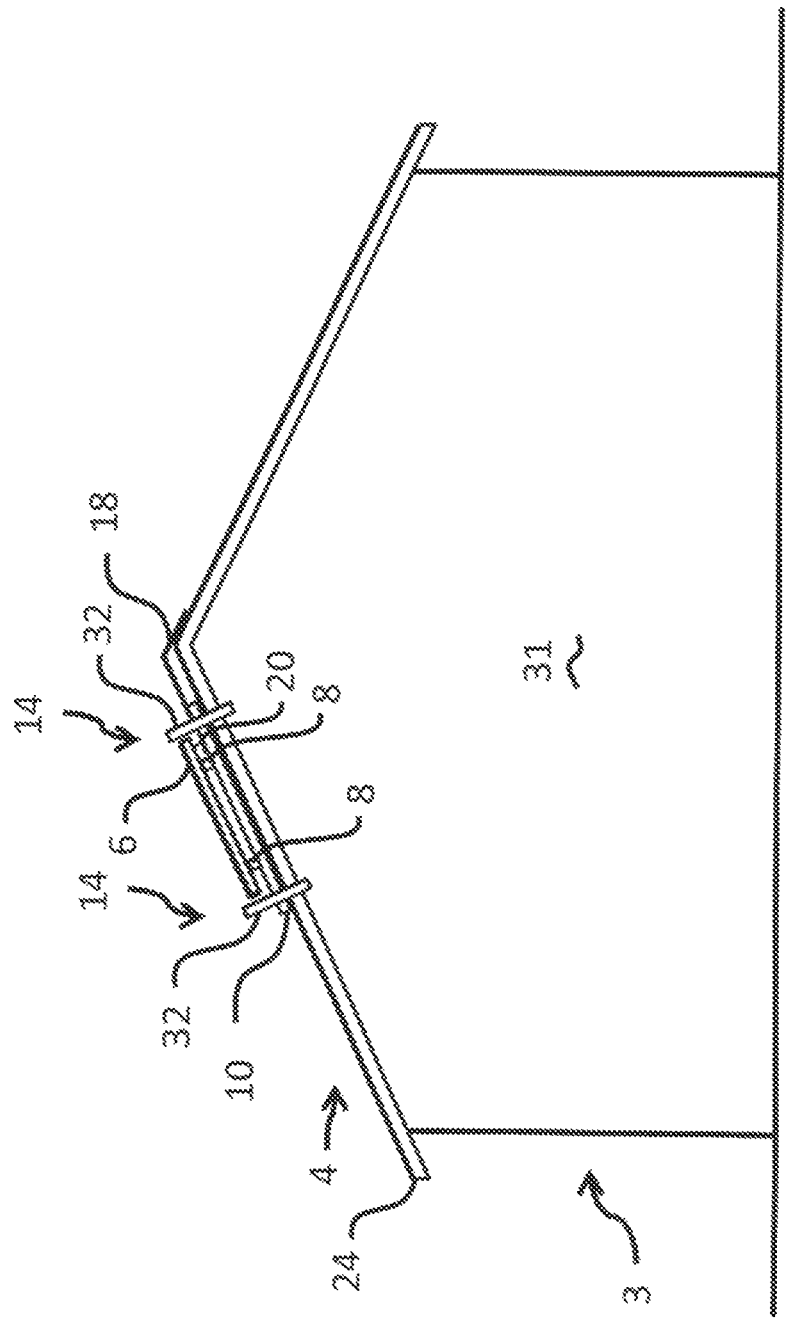

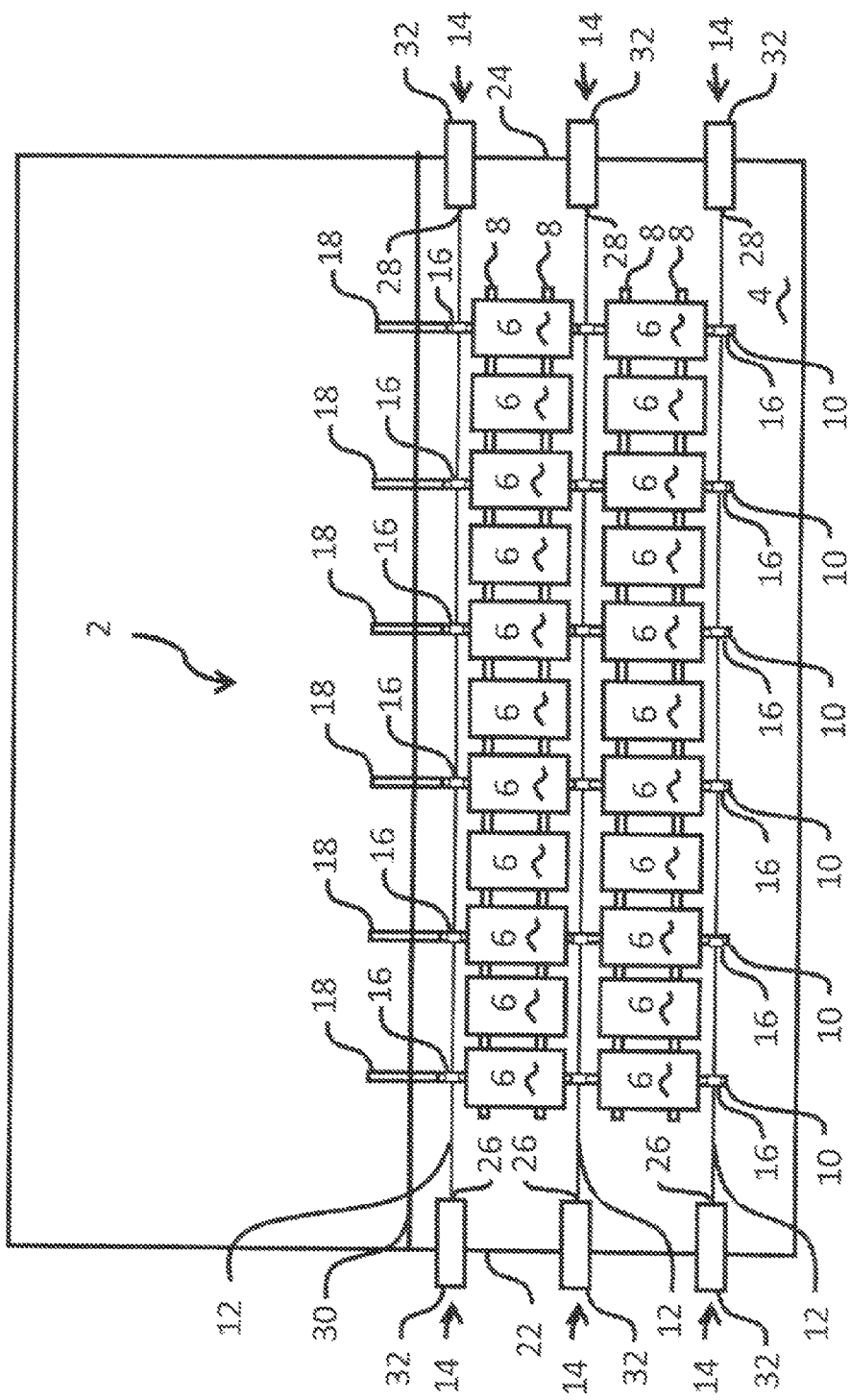

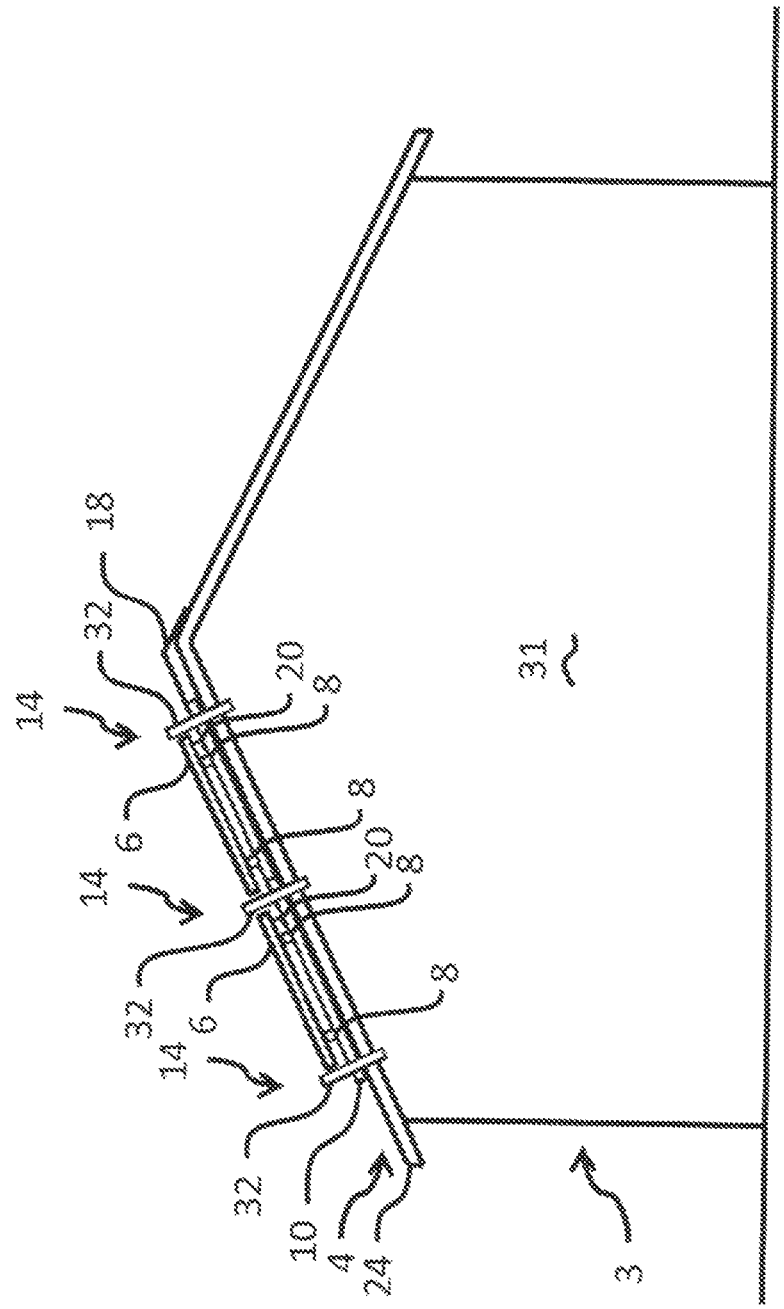

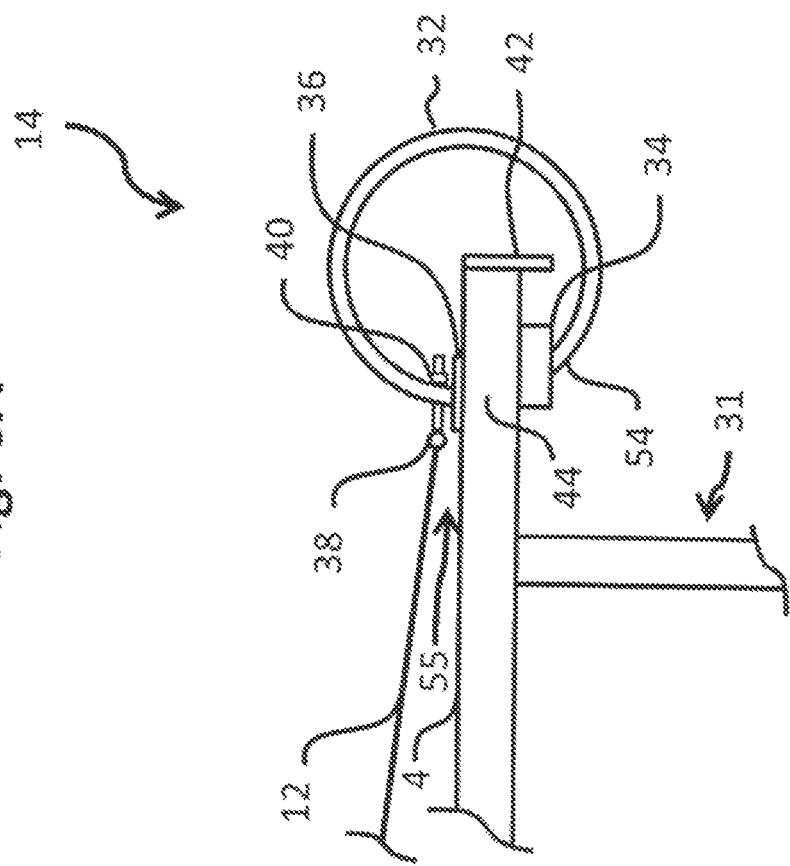

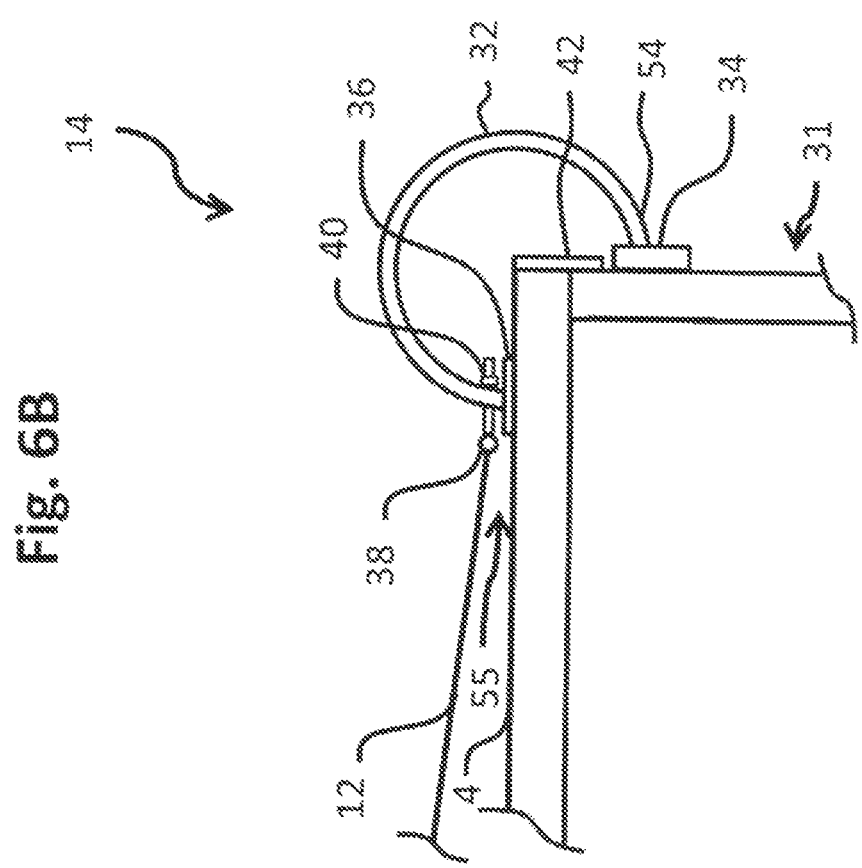

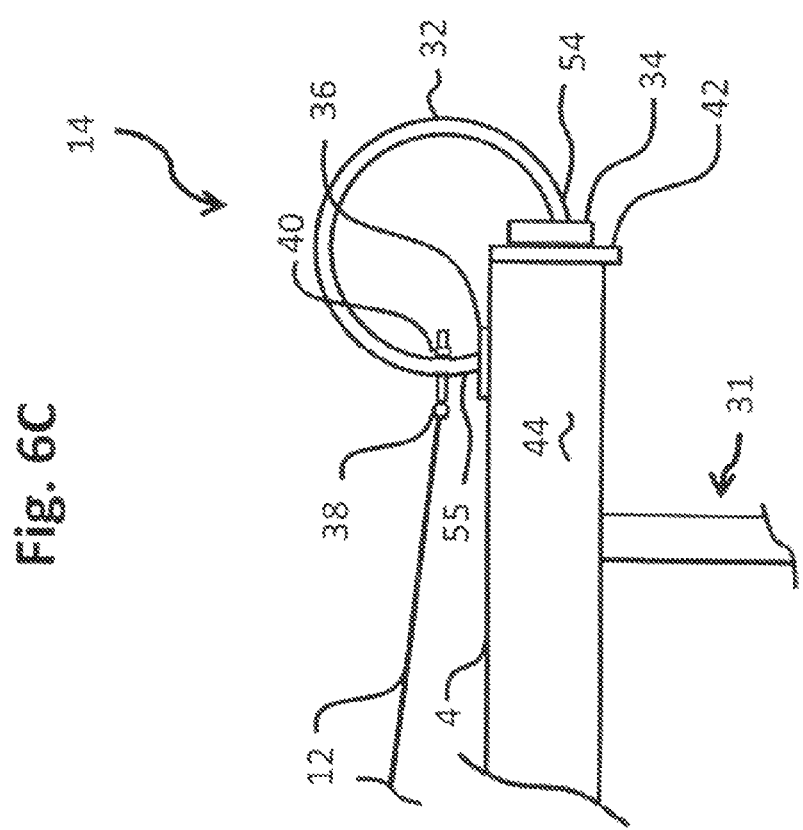

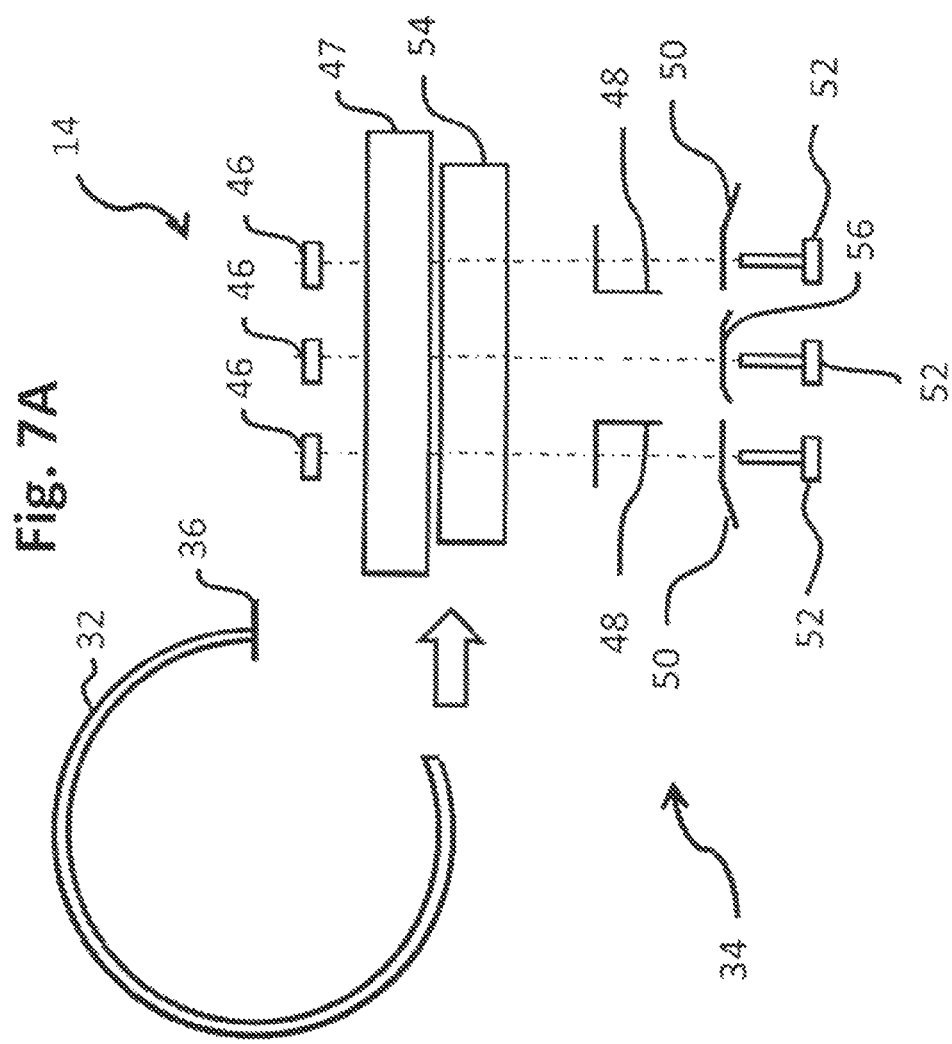

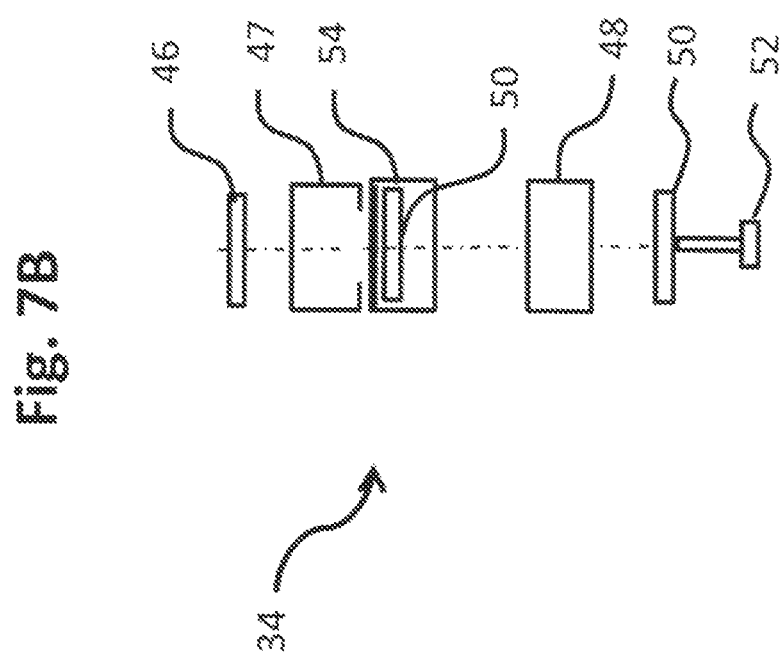

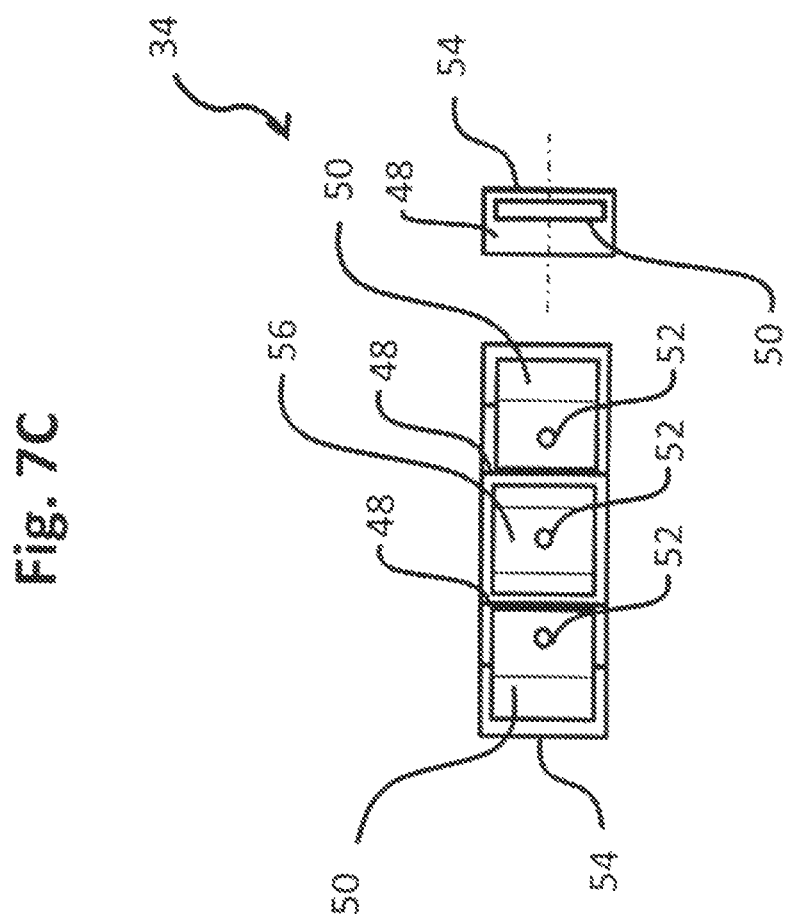

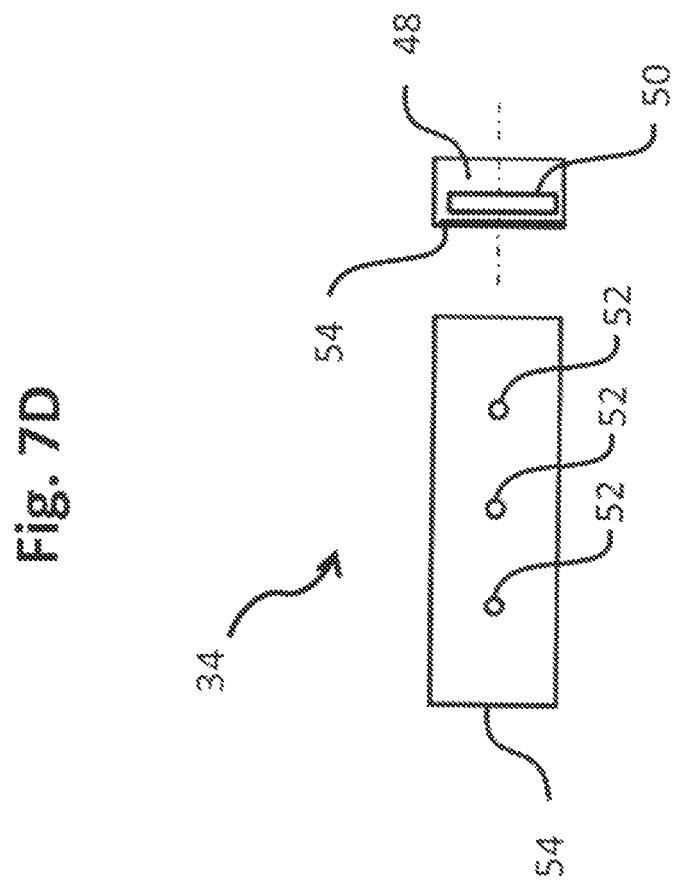

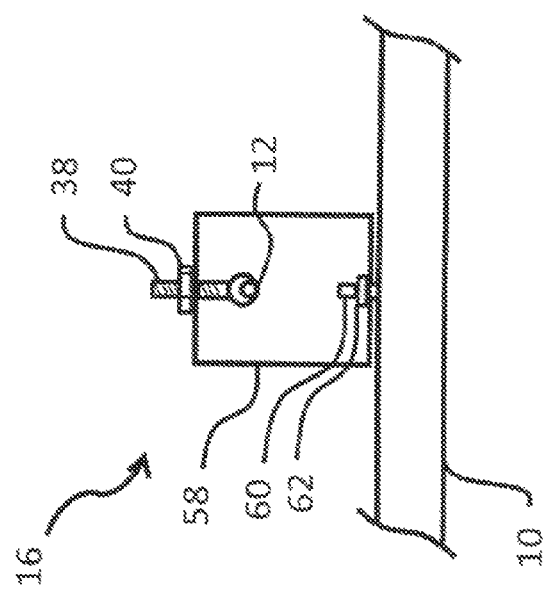

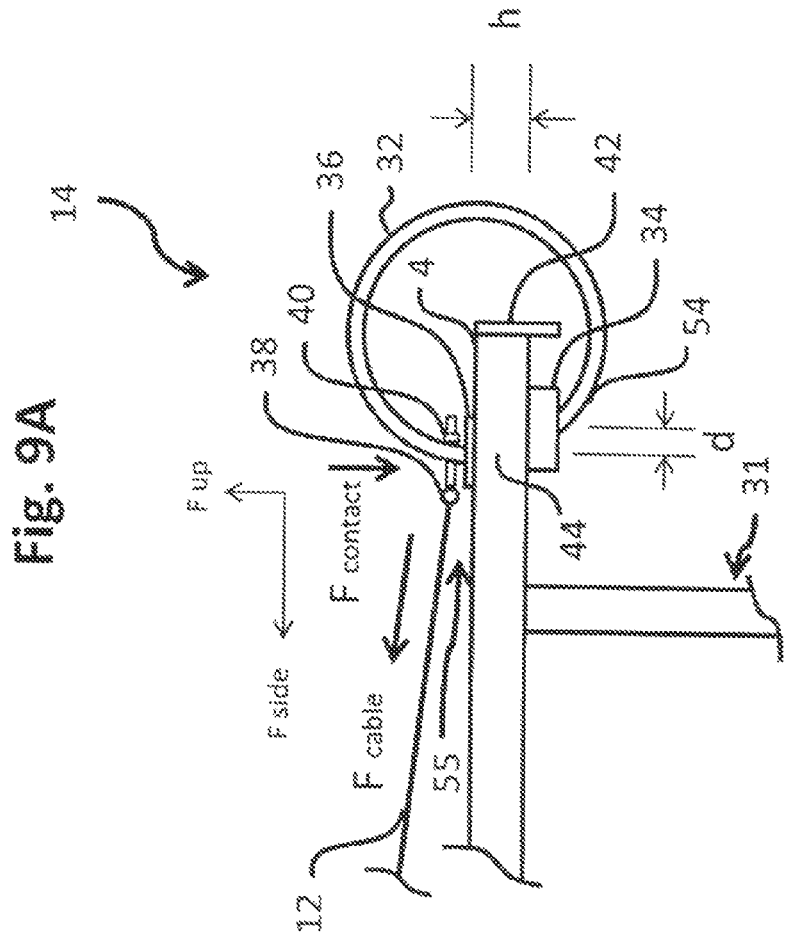

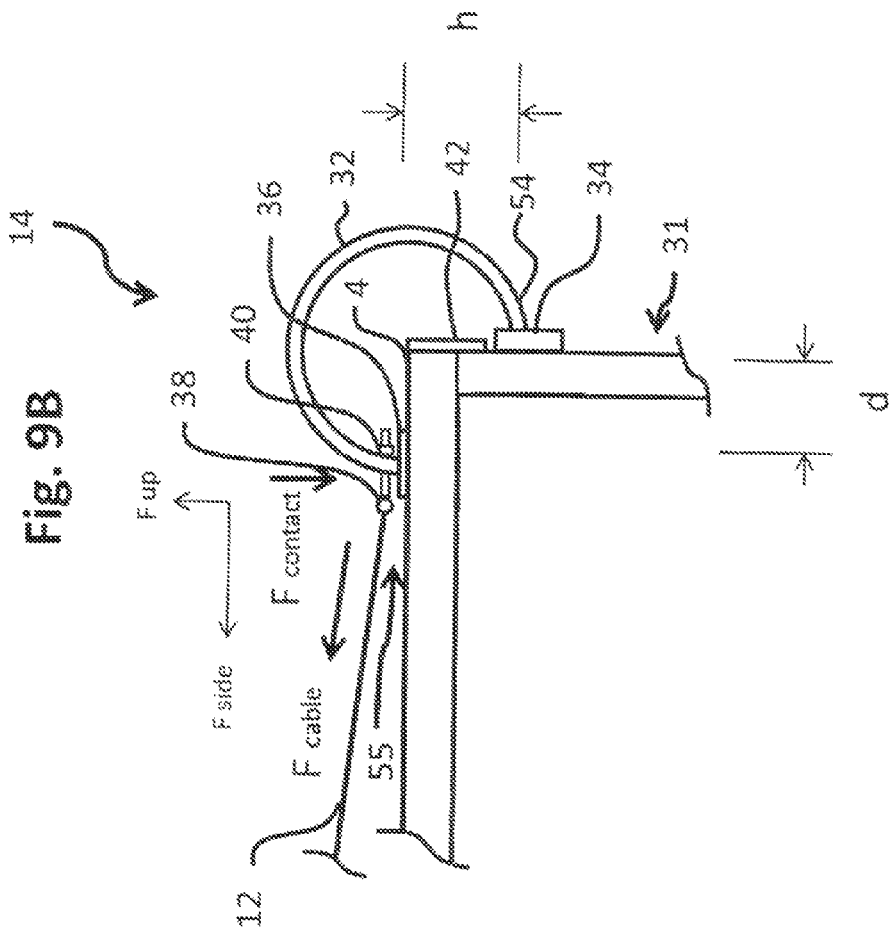

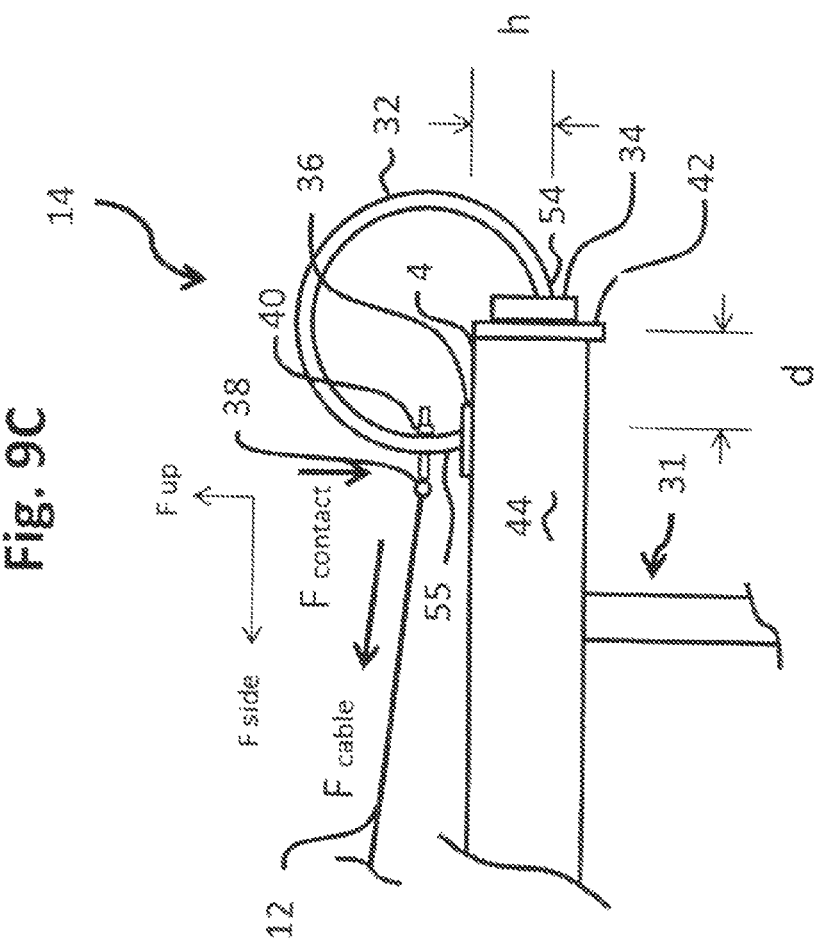

UNIVERSAL NON-PENETRATING ROOF SOLAR PANEL MOUNTING SYSTEM

CROSS-REFERENCE TO RELATED APPLICATION

This is a Continuation-In-Part Application claiming priority under 35 USC 120 of U.S. patent application Ser. No. 12/723,871 filed Mar. 15, 2010 entitled "Tensioned Cable Solar Panel Mounting System", said application hereby incorporated by reference.

FIELD OF THE INVENTION

This invention relates generally to the mounting, securing and operation of solar energy collectors such as photovoltaic panels, and more particularly to a hold down system that retains solar panels in position via cables under tension attached to roof-edge mounts universally adaptable to any type of roof edge, whether eaved, squared, angled, flat, with or without fascia, with no roof-surface penetration.

BACKGROUND OF THE INVENTION

Concerns of excessive roofing material and roofing membrane penetrations pose a practical and economic burden on conventional means of securing solar photovoltaic panels ("pv panels" or "pv modules") to buildings and other structures. Conventional mounting systems typically utilize roof-penetrating threaded fasteners to secure solar panels to rooftops. The associated cost of those parts, along with the added cost of man-power and time required for installation, contributes significantly to the high-cost of photovoltaic systems.

The hardware-heavy conventional panel mounting systems are harmful to the existing roof structure and are expensive to purchase and install. Installers of the systems are required to climb onto roofs for extended periods—adding wear and tear to roofing materials. Moreover, installers of the conventional systems are required to repeatedly pierce/penetrate the roofing material at spaced intervals to secure rails retaining the panels. Once these holes are introduced into the roofs, there is a likelihood of eventual water damage to the roof and structure interior from rain water leaking into the holes.

In addition, many homeowners or business owners who may otherwise desire photovoltaic systems on their residential or commercial property rooftops are prohibited from doing so by virtue of the existing roofing material such as tiles, or the age of the roof that would require removal of the photovoltaic system within a few years in order to re-cover the roof with new material. Other homeowners, such as renters, may want to invest in a photovoltaic system but cannot do so given the damage such a system would do to the landlord's property combined with the expense and difficulty of removing the system and re-mounting it to a subsequent dwelling.

As a result, conventional photovoltaic mounting systems are expensive, difficult to install, damaging to the structure they are installed upon, difficult and expensive to remove/replace, environmentally unsound, unappealing and/or impossible to install given roof top materials and/or age of roof top materials. Photovoltaic systems are simply outside the reach of the vast majority of consumers. The high cost of photovoltaic systems is a well-known deterrent to the typical consumer—even those consumers highly desirous of adding photovoltaic systems to their homes or businesses to reduce their carbon emission footprint. As long as the cost of photovoltaic systems remains high relative to the cost of grid-supplied energy, consumers are unlikely to invest in a photovoltaic system regardless of their interest or desire for alternative, grid-free energy sources.

Accordingly, there is an as of yet unmet need in the art for a solar panel mounting system that: 1) requires a minimum of parts, materials and hardware to retain the pv panels in the desired position; 2) may be installed and removed in a minimum amount of time; 3) may be installed on any structure; 4) may be installed on any roof top material or design; 5) does not require permanent damage to roof materials through roof penetration of screws, bolts, and the like; and, 6) is cost effective, and not cost-prohibitive, relative to existing costs for grid-supplied energy.

THE INVENTION

Summary of the Invention

The inventive Universal Non-Penetrating Roof Solar Panel Mounting System of this application comprises a system for suspending photovoltaic modules ("pv modules") relative to a surface (such as a roof top) having a left edge and a right edge. The system comprises: 1) a first cable generally parallel to and spaced from a second cable, each of said cables comprising a left end and a right end; 2) a first, second, third and fourth generally C-shaped cable arm, each of said cable arms having a base margin and a top margin; 3) the left end of the first cable attached to the top margin of the first cable arm; 4) the right end of the first cable attached to the top margin of the second cable arm; 5) the left end of the second cable attached to the top margin of the third cable arm; 6) the right end of the second cable attached to the top margin of the fourth cable arm; 7) the base margin of each of the first and third cable arms spaced from the surface and secured proximate to the left edge of the surface by a first and third pivot joint assembly; 8) the base margin of each of the second and fourth cable arms spaced from the surface and secured proximate to the right edge of the surface by a second and fourth pivot joint assembly; 9) a lift tensioner assembly in cooperative association with each cable; 10) a vertical rail generally perpendicular to and spanning the first and second cables; and, 11) at least two spaced horizontal rails retained on the vertical rail and positioned generally parallel to and between the cables.

Each of the cables is retained under a desired tension force applied to the cable arms transferring a lesser portion of the tension force to the top margin of the cable arms at a non-penetrating point of contact between the top margins of the cable arms and the surface, on the one hand, and a greater portion of the tension force to the pivot joint assemblies, on the other hand.

The pv modules are retained against the horizontal rails by a plurality of clamps.

The cables, under tension, hold down the vertical rail, which in turn supports the horizontal rails, which in turn supports the pv modules, which are thereby retained in position without any roof surface penetration.

BRIEF DESCRIPTION OF THE DRAWINGS

The invention is described in more detail with reference to the attached drawings, in which:

FIG. 3 is a side plan view drawing of the single row system shown in FIG. 2;

FIG. 4 is a top plan view drawing of an exemplary system suspending a plurality of pv panels in two rows over a roof surface, according to the invention;

FIG. 5 is a side plan view drawing of the double row system shown in FIG. 4;

FIGS. 6A-6C are a series of cross-sectional partial view drawings of the C-shaped universal cable arm assembly installed on a roof edge having an eave (FIG. 6A), a squared-off roof edge with no eave (FIG. 6B), and a roof edge comprising a fascia board (FIG. 6C);

FIG. 7A is an exploded view drawing of the components of the cable arm assembly;

FIGS. 7B-7D are exploded view drawings of the pivot joint assembly components from the side (FIG. 7B), the top (FIG. 7C) and the bottom (FIG. 7D);

FIG. 8B is an end view of the lift tensioner assembly shown in FIG. 8A; and,

FIGS. 9A-9C are a series of cross-sectional partial view drawings of the cable arm assembly installed on a flat roof edge having an overhanging eave (FIG. 9A), a flat squared-off roof edge with no eave (FIG. 9B), and a flat roof edge comprising a fascia board (FIG. 9C), each of said drawings further including distance, height and force indicia.

DETAILED DESCRIPTION OF THE ILLUSTRATIVE EMBODIMENT

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the diagrams show in schematic, or omit, parts that are not essential in that diagram to a description of a particular feature, aspect or principle of the invention being disclosed. Thus, the best mode embodiment of one feature may be shown in one diagram, and the best mode of another feature will be called out in another diagram.
Universal Non-Penetrating Roof Solar Panel Mounting System In general terms, the Universal Non-Penetrating Roof Solar Panel Mounting System of the present application is a novel mounting system for holding down pv modules to roofs via cables under tension, obviating roof surface penetration, thereby maintaining the integrity of the existing roofing materials. The inventive system is highly adaptable to a range of structures from residential homes to commercial buildings. The system is further adaptable in size, extending from small scale installations of less than 1 kilowatt, to large arrays providing a power source in excess of 100 kilowatts.

Figure 1:
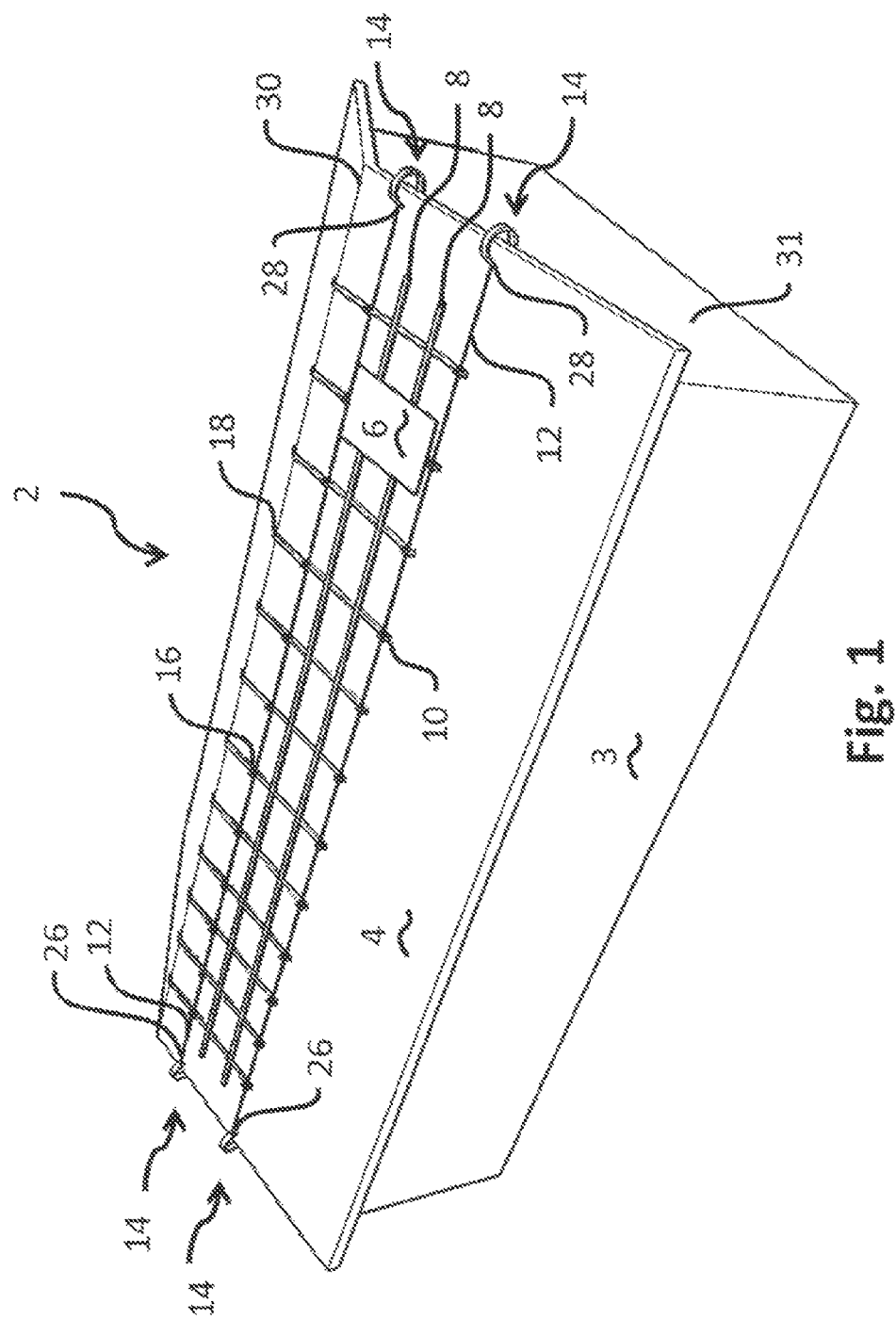
FIG. 1 is a perspective view drawing of an exemplary system showing a pv panel retained above a roof surface, according to the invention.

FIG. 1 shows a perspective view of an exemplary system 2 for a structure 3, such as a home, having gable ends 31 with a peak roof 30. Referring to FIG. 1, the system 2 comprises two generally parallel and spaced cables 12, each of the cables comprising a left end 26 and a right end 28. The cable ends 26/28 are securely connected to opposed pairs of generally C-shaped cable arm assemblies 14.

Referring to FIG. 1, a series of vertical rails 10 are positioned generally perpendicular to the cables 12. The vertical rails 10 are attached to the cables 12 via lift tensioner assemblies 16. The vertical rails 10 are further retained in position by peak mount brackets 18. The peak mounts 18 comprise an angled end shaped to rest over and against the roof ridge 30. A pair of horizontal rails 8 is positioned on top of the vertical rails 10. The horizontal rails 8 are spaced apart, are generally parallel, and are positioned between the cables 12. A pv module 6 is shown retained against the horizontal rails 8 via a plurality of pv clamps (not shown). The cables 12, under tension, hold down the vertical rails 10, which in turn support the horizontal rails 8, which in turn support the pv module 6, without any roof surface penetration, as further disclosed herein.

Figure 2:
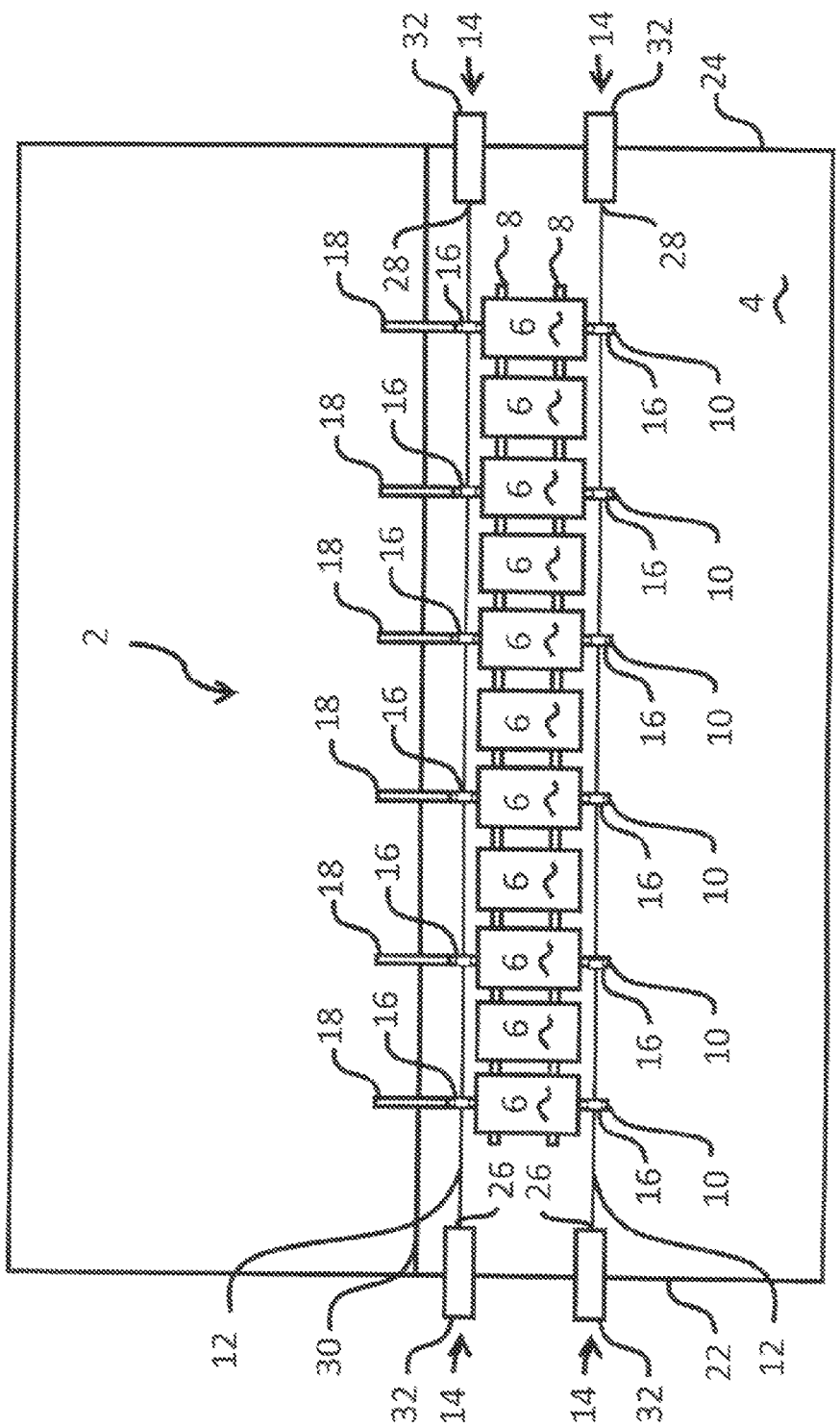
FIG. 2 is a top plan view drawing of an exemplary system suspending a plurality of pv panels in a single row over a roof surface, according to the invention.

FIG. 2 shows a top plan view of the same system configuration 2 as shown in FIG. 1, but with an entire row of mounted pv modules 6. Referring to FIG. 2, the cables 12 span the entire roof surface 4 from the left edge of the roof 22 to the right edge of the roof 24. The cable arm assemblies 14 retain the cable ends 26/28 under tension in cooperative association with a series of lift tensioner assemblies 16 shown in FIG. 2 spaced along the length of both cables 12. The system 2 shown in FIG. 2 supports a single row of pv modules 6 generally spanning the length of the roof surface 4 from the left edge 22 to the right edge 24.

FIG. 3 shows a side view of the same structure 3 shown in FIG. 2. Referring to FIG. 3, viewable from the side view at the gable 31 end of the structure 3 are the cable arm assemblies 14 extending around the right edge 24 of the roof 4 and extending beneath the roof edge 24. The pv module 6 is shown retained against the pair of horizontal rails 8, which in turn are supported by the vertical rail 10. The vertical rail is retained in position by the non-penetrating peak mount 18 and cables 12 running through lift tensioner assemblies 16 (shown in FIGS. 1 and 2).

Referring to FIGS. 1-3, the pv modules 6 are retained against the horizontal rails 8 by conventional pv clamps (not shown).

FIG. 4 shows an alternate configuration for the system 2 comprising two continuous rows of pv modules 6 spanning the length of the roof surface 4. Referring to FIG. 4, this double-row configuration 2 requires only three cables 12, six cable arm assemblies 14, six vertical rails 10 and four horizontal rails 8 to support 22 pv modules 6. As with the previous single-row configuration, the double-row configuration shown in FIG. 4 retains all 22 modules 6 in position above the roof surface 4 without any roof surface 4 penetration due to the cables 12 under tension. The cables 12 under tension hold down the vertical rails 10 which are securely attached to the crossing horizontal rails 8 which, in turn, support the pv modules 6.

FIG. 5 shows a side view of the same structure 3 and system configuration shown in FIG. 4. Referring to FIG. 5, three cable arm assemblies 14 are viewable from the side view at the gable 31 end of the structure 3. The cable arm assemblies 14 extend around the right edge 24 of the roof 4 and further extend beneath the roof edge 24. The two rows of pv modules 6 are shown retained against the two pairs of horizontal rails 8, which in turn are supported by the one viewable vertical rail 10. The vertical rail 10 is retained in position by the non-penetrating peak mount 18 and cables 12 running through lift tensioner assemblies 16 (shown in FIGS. 3 and 4).

Referring to FIGS. 1-5, the system may further comprise pv clips 20 (called out in FIGS. 3 and 5) used to at least temporarily retain the pv modules 6 in position during system installation. The clips 20 keep the pv modules 6 from sliding off the roof 4 (in the case of an inclined roof surface 4) before the pv modules 6 are secured to the horizontal rails 8 by conventional pv clamps (not shown). The clips 20 are left on the system 2 after the installation is completed, or removed if desired.

The modules 6 shown in FIGS. 1 through 5 are conventional framed silicon pv panels. It should be understood that any suitable or desired modules 6 of any shape, size or design may be utilized with the present invention, including without limitation, monocrystalline silicon panels, polycrystalline silicon panels, string ribbon silicon panels, thin-layer silicon panels, amorphous silicon panels, Group III Element panels, Group IV Element panels, concentrator modules, high-efficiency multi-junction modules, flat-plate stationary arrays, adjustable arrays, portable arrays, and/or reflector modules. Given the flexibility permitted in positioning the cables 12, the system may be used universally to mount any shape and/or type of desired module(s) 6.

FIGS. 6A through 6C are a series of cross-sectional partial view drawings of the C-shaped cable arm assembly 14 installed on exemplary roof edges. The roof edge shown in FIG. 6A has an overhanging eave 44 with fascia board 42. The roof edge shown in FIG. 6B is squared-off and has no eave. The roof edge shown in FIG. 6C also has an overhanging eave with fascia board 42, but shows an alternate installation of the cable arm assembly 14 directly to the fascia board 42.

Referring to FIG. 6A, the cable arm assembly 14 comprises a C-shaped cable arm 32, a pivot joint assembly 34, a cable arm pad 36, a pull eye bolt 38 and a pull eye nut 40. The cable arm 32 comprises a base margin 54 and a top margin 55. The base margin 55 is secured in position on the under side of the eave 44 by the pivot joint assembly 34. As shown in FIG. 6A, the cable arm 32 extends outwardly away form the gable end (external side wall of the structure) 31 and around the fascia board 42 with no contact against the roof edge. The top margin of the cable arm 55 is held under tension against the cable arm pad 36. The tension is created, in part, by the pulling force of the cable 12 via the pull eye bolt inserted through the cable arm 32 and tightened with the pull eye nut 40. Neither the top margin of the cable arm 55 nor the cable arm pad 36 penetrates the overhang 44. Rather, the pad 36 is pressed against the overhang 44 by the top margin of the cable arm 55 held under pressure by the transfer of tensioned cable forces 12.

The cable arm 32 is constructed from a circular shaped schedule 40 steel pipe cross-cut to approximately two inches in width. The arm 32 is sufficiently flexible to accommodate any roof edge design, including without limitation, the roof edge designs shown in FIGS. 6A through 6C. It should be further understood that the cable arm 32 may be constructed of any desired or suitable material, including metal, alloys, plastics, composite materials, and combinations thereof, including layered combinations.

Given the shape and design of the cable arm 32, the cable arm assembly 14 is adaptable to any roof pitch regardless of depth of overhang or absence of overhang. The cable arm assembly 14 is uniquely and universally adaptable for use with low or high profile roof systems, decks, and the like. Due to the lack of roof surface penetration, the cable arm assembly 14 is universal to roofs of all types and materials, including without limitation, shingles, asphalt, composition, metal, tile materials, with or without soffits, thin versus thick roof structures, residential, commercial, industrial, flat, pitches, trussed conventional, and/or structural insulated panels. In addition, depending on the overall size of the mounted panels 6, the local wind conditions, specific overhang designs, or other factors, the cable arms 32 may be available in different sizes, providing identical function while maintaining interchangeability.

FIG. 6B demonstrates application of the cable arm assembly 14 on a squared-off roof with no overhang. Referring to FIG. 6B, the pivot joint assembly 34 is attached to the external wall 31 of the structure (as opposed to the base of a roof overhang has shown in FIG. 6A). The bottom margin 54 of the cable arm 32 is attached to the pivot joint assembly 34 and extends outwardly away from the wall 31 around the fascia 42 and to the top of the flat roof 4. As with the gable roof mount shown in FIG. 6A, the top margin 55 of the cable arm 32 shown in FIG. 6B pins a cable pad 36 to the roof surface 4 when held under tension by the cable 12. The cable 12 is retained under tension in part by the tightened bolt 38 attached to the cable 12 and threaded through the cable arm 32.

FIG. 6C shows a third possible position of the cable arm 32 relative to a flat roof overhang 44. Referring to FIG. 6C, the pivot joint assembly 34 of the cable arm assembly 14 is attached to the fascia 42 with the cable arm 32 extending outwardly up and around the roof edge to the top surface of a flat roof overhang 44. Again, the bottom margin 54 of the cable arm 32 is securely retained by the pivot joint assembly 34, and the top margin 55 of the cable arm 32 is pinned against a non-penetrating cable arm pad 36 resting on the top of the overhang 44. Tension forces on the cable 12 are applied to the top margin 55 of the cable arm 32 retain a downward force on the cable arm pad 36 as further disclosed in connection with FIGS. 9A through 9C, infra.

FIG. 7A shows an exploded view of the components of the cable arm assembly 14. Referring to FIG. 7A, the assembly 14 comprises the C-shaped cable arm 32 and cable pad 36, and a pivot joint assembly 34. The pivot joint assembly 34 comprises three mounting bolts 52 threaded through two opposed end keeper clips 50 and a central mid keeper clip 56. The end keeper clips 50 are inserted within 90 degree angled cross braces 48, which in turn retain the cable arm base margin 54 inserted within a uni-strut base 47 with bolt ends tightened by spring nuts 46.

FIGS. 7B-7D are exploded view drawings of the pivot joint assembly 34 components from the side (FIG. 7B), the top (FIG. 7C) and the bottom (FIG. 7D). As shown in FIG. 7B, the pivot joint assembly 34, in an exploded view from the side, comprises a mounting bolt 52 inserted through an end keeper clip 50 inserted within a cross brace 48 inserted within a uni-strut base 47. The mounting bolt 52 is threaded through a hole (not shown) in the cable arm base margin 54 also inserted within the uni-strut base 47. A tightened spring nut 46 on the bolt 52 retains the pivot joint assembly 34 components together.

The uni-strut base 47 shown in FIGS. 7A and 7B is generally rectangular in shape, however, it may be bracket-shaped or custom-shaped.

The pivot joint assembly 34 components are shown from the top view in FIG. 7C. Referring to FIG. 7C, the pivot joint assembly 34 comprises the three spaced bolts 52 extending through the cable arm base margin 54 further retained by the end keeper clips 50, the mid keeper clip 56, and the cross braces 48. FIG. 7D shows the same pivot joint assembly 34 from a bottom view. Referring to FIG. 7D, the spaced bolts 52 are shown extending through the cable arm base margin 54 to be inserted within the cross brace 48 further retained by the end keeper clip 50.

Referring to FIGS. 6A-7D, the hardware components of the pivot joint assembly 34 permit positioning of the assembly 34 in multiple orientations and locations under a roof eave (FIG. 6A), on an outer wall (FIG. 6B), and on the edge of an overhanging roof (FIG. 6C), including without limitation, parallel to the roof surface (FIG. 6A) or perpendicular to the roof surface (FIGS. 6B and 6C). The orientation is selected based on factors including the width of the roof and/or overhang.

Referring again to FIGS. 6A-7D, the pivot joint assembly 34 permits the cable arm 32 to be mounted at different points along the length of the assembly 34 and, where desired, pivoted on its base margin 54 under the end keeper clip 50. For example, referring to FIG. 6C, the base margin 54 of the cable arm 32 may be secured against the mid keeper clip 56 for mounting to the fascia 42 of an overhang 44. The mid keeper clip 56 acts as a base for the cable arm 32 to rest on as the cross brace 48 pushes back on the cable arm 32 or acts as the sides of the cable arm 32, while the end keeper clip 50 tucks over the base of the cable arm 54. In other words, the cable arm 32 can pivot on the ends or in the middle of the pivot joint assembly 34. If in the middle, the cable arm 32 presses down on the mid keeper clip 56 and is aligned with the length of the assembly 34 or 90 degrees to the orientation of the assembly 34 depending on the position relative to the roof edge 22/24 or overhang 44.

Figure 8A:
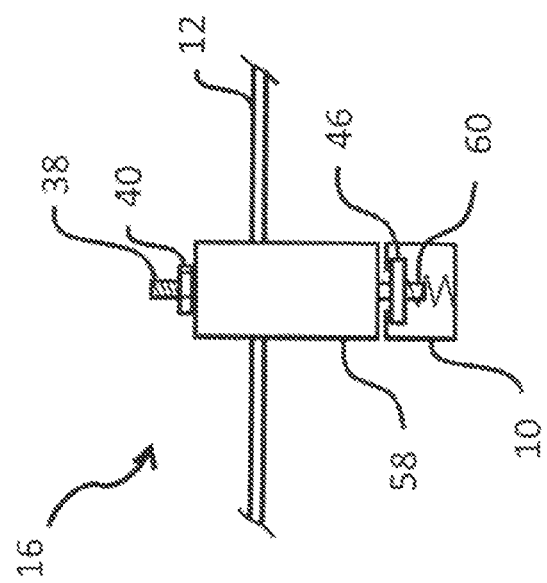
FIG. 8A is a side view drawing of a lift tensioner assembly.

FIG. 8A shows a lift tensioner assembly 16 for adjustment of tension forces on the cable 12. FIG. 8B shows the same lift tensioner assembly 16 from the side with cable 12 running toward the viewer. Referring to FIG. 8A, the lift tensioner assembly 16 comprises a hollow lift box 58 with a pull eye bolt 38 and nut 40 extending through the top of the lift box 58. The base of the lift box 58 is attached to a vertical rail 10 via a lift box bolt 60 and a spring nut 46 tightened within the vertical rail 10. As shown in FIG. 8B, the lift box bolt 60 is further attached to the base of the lift box 58 via a tightened lift box nut 62. As a result, the tension-controlling eye bolt 38 is inserted within the lift box 58 with the end of the bolt end extending in an upward direction outside the top margin of the box 58 and the eye portion of the bolt 38 positioned within the box 58. The bolt 38 is retained by a tightened pull eye nut 40 inserted over and around the bolt 38 end. The cable 12 is threaded through the open ends of the box 58 and through the eye opening of the eye bolt 38.

Referring to FIGS. 8A and 8B, in operation, the lift tensioner assembly 16 is adjustable by use of a wrench (not shown) adjusting the pull eye nut 40. The nut 40, as it is adjusted, causes the eye bolt 38, through which the cable 12 is run, to move in an upward or downward direction, thereby increasing or decreasing tension on the cable 12. Adjustment of the pull eye nut 40 in a clockwise direction raises the eye bolt 38, thereby lifting the cable 12 inserted through the opening in the eye bolt 38. The lifting of the cable places increased tension on the cable 12 due to the secure attachment of the cable ends 26/28 to the cable arm assemblies 14 as shown in FIGS. 1 through 5. Likewise, adjustment of the pull eye nut 40 in a counter-clockwise direction lowers the eye bolt 38, thereby lowering the position of the cable 12 within the eye bolt 38, and decreasing the tension on the cable 12.

Referring again to FIGS. 8A and 8B, the lift tensioner box 58 is attached to a supporting vertical rail 10. The rail 10 is configured to both support the lift tensioner box 58 on its top side, and conform to the shape and materials of the roof surface (not shown), on its base side. The rails 10 shown in FIGS. 8A and 8B are box-shaped to generally conform to the base of the box-shaped lift tensioner 58, on the one hand, and a relatively flat roof surface, on the other hand. However, it should be understood that the vertical rails 10 may be of any suitable shape or design depending on the roof surface, pitch and roofing materials utilized.

Referring to FIGS. 8A and 8B, the system may further include one or more conventional turnbuckles (not shown) along the length of cable 12 to provide additional tension adjustment options.

The preferred cable 12 material is galvanized ¼ inch steel cable; however, any desired or suitable cable 12 material and diameters may be utilized, including, without limitation, stainless steel cable, wire ropes, and/or nylon ropes.

FIGS. 9A-9C are a series of cross-sectional partial view drawings of the cable arm assembly 14 installed on a flat roof edge having an overhanging eave (FIG. 9A), a squared-off flat roof edge with no eave (FIG. 9B), and a flat roof edge comprising an eave and fascia board (FIG. 9C).

Referring to FIGS. 9A-9C, the cable arm assembly 14 when installed and providing tension to the cable 12 in cooperative association with the lift tensioner assemblies (shown in FIGS. 8A and 8B), imposes various forces on the cable 12 and cable assembly 14. The pulling force of the cable 12 on the cable arm 32 is shown by arrow "F cable". The "F cable" translates to a downward force on the cable arm pad 36 indicated by arrow "F contact". The cable arms 32 carry and transfer the "F cable" to the underside of the overhang 44 (FIG. 9A), the structure's side wall 31 (FIG. 9B), or the fascia board 42 (FIG. 9C) to simultaneously retain the cable 12 in a tensioned state while exerting the least amount of force necessary on the roof surfaces. Consequently, each of the cables 12 is retained under a desired tension force applied to the cable arm assemblies 14 transferring a lesser portion of the tension force to the cable arm assemblies 14 at a non-penetrating point of contact between the cable arm assemblies and the surface, on the one hand, and a greater portion of the tension force to the pivot joint assemblies, on the other hand. The transfer of the "F cable" to non-roof surface points of contact obviates the need for roof-penetrating materials, thereby ensuring the continued integrity of the roof surface.

Creation and Maintenance of Necessary Cable Tension

Referring to FIGS. 9A-9C, dimension "d" represents a horizontal distance between the base margin of the cable arm 54 mounted within the pivot joint assembly 34, on the one hand, and the overlapping top margin of the cable arm 55 where it contacts the roof surface 4, on the other hand. Referring again to FIGS. 9A-9C, vertical distance "h" represents the distance (height) between the base margin of the cable arm 54 mounted within the pivot joint assembly 34, on the one hand, and the top margin of the cable arm 54, on the other hand.

Referring to the dimensions labeled in FIGS. 9A-9C, Table A discloses preferred force and dimension ranges for the inventive system 2. The goal of the preferred ranges disclosed in Table A is to achieve a maximum force supporting the panel array 6 while simultaneously minimizing forces at the pivot joint assembly 34 connection to the roof overhang 44 underside, side wall 31, or fascia 42.

TABLE A

| Cable Force, lbs | Cable Angle, degrees | Distance d, inches | Height h, inches | Contact Force, lbs |
|---|---|---|---|---|
| | 12" dia Cable arm: | 34 deg Cut Out | 34 deg Cut Out | 2x4 Rafter O/H |
| 100 | 5 | 2.68 | 5 | 177.1 |
| | 10 | 2.68 | 5 | 166.4 |
| | 15 | 2.68 | 5 | 154.3 |
| | 20 | 2.68 | 5 | 141.1 |
| | 25 | 2.68 | 5 | 126.8 |

TABLE A-continued

| Cable Force, lbs | Cable Angle, degrees | Distance d, inches | Height h, inches | Contact Force, lbs |
|---|---|---|---|---|
| | 30 | 2.68 | 5 | 111.6 |
| | 35 | 2.68 | 5 | 95.5 |
| | 40 | 2.68 | 5 | 78.6 |
| | 45 | 2.68 | 5 | 61.2 |
| | 50 | 2.68 | 5 | 43.3 |
| 12" dia Cable arm: | 90 deg Cut Out | 90 deg Cut Out | | No Overhang |
| 100 | 5 | 6 | 6 | 90.9 |
| | 10 | 6 | 6 | 81.1 |
| | 15 | 6 | 6 | 70.7 |
| | 20 | 6 | 6 | 59.8 |
| | 25 | 6 | 6 | 48.4 |
| | 30 | 6 | 6 | 36.6 |
| | 35 | 6 | 6 | 24.6 |
| | 40 | 6 | 6 | 12.3 |
| | 45 | 6 | 6 | 0 |
| | 50 | 6 | 6 | -12.3 |
| 12" dia Cable arm: | 120 deg Cut Out | 120 deg Cut Out | | With or w/o O/H |
| 100 | 5 | 5.196 | 3 | 48.8 |
| | 10 | 5.196 | 3 | 39.5 |
| | 15 | 5.196 | 3 | 29.9 |
| | 20 | 5.196 | 3 | 20.1 |
| | 25 | 5.196 | 3 | 10.1 |
| | 30 | 5.196 | 3 | 0 |
| | 35 | 5.196 | 3 | -10.1 |
| | 40 | 5.196 | 3 | -20.1 |
| | 45 | 5.196 | 3 | -29.9 |
| | 50 | 5.196 | 3 | -39.5 |

Referring to Table A and FIG. 9A, the ratio of "d/h" for the configuration shown in FIG. 9A (with roof overhang 44 and pivot joint assembly 34 mounted to underside of overhang 44) is less than 1. Referring to Table A and FIG. 9B, the ratio of "d/h" for the configuration shown in FIG. 9B (roof without overhang with pivot joint assembly 34 mounted to outside wall 31) equals 1. Referring to Table A and FIG. 9C, the ratio of "d/h" for the configuration shown in FIG. 9C (roof with overhang 44 with pivot joint assembly 34 mounted to fascia 42) is greater than 1.

Referring to the left column of Table A, the system 2 is uniquely designed to not require high cable 12 forces (cables 12 under high tension) in order to maintain the pv panels 6 in position. High winds may cause an uplift of the pv panels 6, thereby temporarily increasing the tension in the cables 12. However, the geometry of the rails 8/10 and peak mounts 18, in conjunction with a modest cable 12 tension force, assure that the system 2 is always held down. As a result, high static tensions in the cables 12 are unnecessary. The system 2 is designed to take on dynamic increases in tension, which logically may never be encountered under normal wind conditions at the site, as the weight of the pv panels 6 would first have to be overcome in order to add any tension to the hold down cables 12.

INDUSTRIAL APPLICABILITY

It is clear that the inventive Universal Non-Penetrating Roof Solar Panel Mounting System of this application has wide applicability to the solar energy industry. The application of design science principles involving the use of tension and compression to solar panel systems results in a novel system that allows for the mounting of panels without roof surface penetrating components or ground-based components.

Fabrication of the system components is simple and costs are reduced by virtue of a design relying on simple geometries and readily available materials requiring minimal machining. System hardware may be produced locally with kits provided to installers at a reduced cost for minimal outlay of capital intensive equipment.

It should be understood that various modifications within the scope of this invention can be made by one of ordinary skill in the art without departing from the spirit thereof and without undue experimentation. For example, any suitable or desired materials may be used for the parts disclosed in this application. Alternate embodiments could include arrays of panels mounted across decks or other flat or angled structures to mount pv panels economically and elegantly. This invention is therefore to be defined as broadly as the prior art will permit, and in view of the specification if need be, including a full range of current and future equivalents thereof.

I claim:

1. A system to suspend one or more photovoltaic modules relative to a surface, said surface comprising a left edge and a right edge, said system comprising:

a first cable generally parallel to and spaced from a second cable, each of said cables comprising a left end and a right end;

a first, second, third and fourth generally C-shaped cable arm, each of said cable arms having a base margin and a top margin;

a first, second, third and fourth pivot joint assembly, each of said pivot joint assemblies comprising a plurality of mounting bolts, end keeper clips, a central mid keeper clip, a pair of opposed cross braces, a uni-strut base, and nuts;

a cable arm assembly, said cable arm assembly comprising the cable arm, the pivot joint assembly, a cable arm pad, a pull eye bolt and a pull eye nut;

the left end of the first cable attached to the top margin of the first cable arm;

the right end of the first cable attached to the top margin of the second cable arm;

the left end of the second cable attached to the top margin of the third cable arm;

the right end of the second cable attached to the top margin of the fourth cable arm;

the base margin of the first cable arm spaced from the surface and secured proximate to the left edge of the surface by the first pivot joint assembly;

the base margin of the second cable arm spaced from the surface and secured proximate to the right edge of the surface by the second pivot joint assembly;

the base margin of the third cable arm spaced from the surface and secured proximate to the left edge of the surface by the third pivot joint assembly;

the base margin of the fourth cable arm spaced from the surface and secured proximate to the right edge of the surface by the fourth pivot joint assembly;

a lift tensioner assembly in cooperative association with each cable, said lift tensioner assembly comprising a lift box, a pull eye bolt, a pull eye nut, a lift box bolt and a spring nut;

a vertical rail generally perpendicular to and spanning the first and second cables;

at least two spaced horizontal rails retained on the vertical rail and positioned generally parallel to and intermediate to the cables;

said first cable retained under a first desired tension force applied to the first and second cable arms transferring a lesser portion of the first desired tension force to the top margin of the first and second cable arms at a non-penetrating point of contact between the top margins of the first and second cable arms and the surface, and a greater portion of the first desired tension force to the first and second pivot joint assemblies;

said second cable retained under a second desired tension force applied to the third and fourth cable arms transferring a lesser portion of the second desired tension force to the top margin of the third and fourth cable arms at a non-penetrating point of contact between the top margins of the third and fourth cable arms and the surface, and a greater portion of the second desired tension force to the third and fourth pivot joint assemblies; and, at least one module retained against the horizontal rails by a plurality of photovoltaic clamps.

2. The system of claim 1, wherein the surface is selected from the group consisting of: shingles, asphalt, composition, metal, tile, structural insulated panel.

3. The system of claim 1, wherein the left or right edge is selected from the group consisting of: overhanging eave with fascia, overhanging eave without fascia, no eave with fascia, no eave without fascia.

4. The system of claim 1, wherein the cable arms comprise a cross-sectional portion of steel pipe.

5. The system of claim 1, wherein the photovoltaic module is selected from the group consisting of: monocrystalline silicon panel, polycrystalline silicon panel, string ribbon silicon panel, thin-layer silicon panel, amorphous silicon panel, concentrator photovoltaic module, high-efficiency multi-junction photovoltaic module, flat-plate stationary array, adjustable array, portable array, and reflector photovoltaic module.

6. The system of claim 1, further comprising a peak mount.

7. The system of claim 1, further comprising a turnbuckle.

8. The system of claim 1, comprising a single row of mounted photovoltaic modules.

9. The system of claim 1, comprising two rows of mounted photovoltaic modules.

10. The system of claim 1, wherein a ratio of a horizontal distance and vertical distance between the base margin of the cable arm, and the top margin of the cable arm is less than 1.

11. The system of claim 1, wherein a ratio of a horizontal distance and vertical distance between the base margin of the cable arm and the top margin of the cable arm equals 1.

12. The system of claim 1, wherein a ratio of a horizontal distance and vertical distance between the base margin of the cable arm and the top margin of the cable arm is greater than 1.

* * * * *